US006849106B2

(12) United States Patent
Le Bec

(10) Patent No.: US 6,849,106 B2
(45) Date of Patent: Feb. 1, 2005

(54) METHOD FOR PURIFYING HYDROGEN-BASED GAS MIXTURES USING A CALCIUM X-ZEOLITE

(75) Inventor: Remi Le Bec, Labastide Cezeracq (FR)

(73) Assignee: CECA S.A., Puteaux (FR)

(*) Notice: Subject to any disclaimer, the term of this patent is extended or adjusted under 35 U.S.C. 154(b) by 0 days.

(21) Appl. No.: 10/332,349

(22) PCT Filed: Jul. 2, 2001

(86) PCT No.: PCT/FR01/02115

§ 371 (c)(1),
(2), (4) Date: May 19, 2003

(87) PCT Pub. No.: WO02/04096

PCT Pub. Date: Jan. 17, 2002

(65) Prior Publication Data

US 2003/0172808 A1 Sep. 18, 2003

(30) Foreign Application Priority Data

Jul. 7, 2000 (FR) .......................................... 00/08905

(51) Int. Cl.[7] .......................................... B01D 53/047
(52) U.S. Cl. ........................... 95/97; 95/100; 95/105; 95/119; 95/130; 95/139; 95/140; 95/143
(58) Field of Search .................... 95/96–106, 117–119, 95/130, 139, 140, 143–145, 147, 902

(56) References Cited

U.S. PATENT DOCUMENTS

| 2,944,627 | A | * | 7/1960 | Skarstrom | 95/26 |
| 3,150,942 | A | * | 9/1964 | Vasan | 95/115 |
| 3,430,418 | A | * | 3/1969 | Wagner | 95/100 |
| 4,322,394 | A | * | 3/1982 | Mezey et al. | 423/244.11 |
| 4,381,189 | A | * | 4/1983 | Fuderer | 95/100 |
| 4,477,267 | A | * | 10/1984 | Reiss | 95/139 |
| 5,152,813 | A | * | 10/1992 | Coe et al. | 95/103 |
| 5,294,247 | A | | 3/1994 | Scharpf et al. | |
| 5,413,625 | A | * | 5/1995 | Chao et al. | 95/103 |
| 5,454,857 | A | * | 10/1995 | Chao | 95/96 |
| 5,529,610 | A | * | 6/1996 | Watson et al. | 95/100 |
| 5,656,066 | A | * | 8/1997 | Reiss et al. | 95/96 |
| 5,674,311 | A | * | 10/1997 | Notaro et al. | 95/96 |
| 5,912,422 | A | * | 6/1999 | Bomard et al. | 95/96 |
| 6,024,781 | A | * | 2/2000 | Bulow et al. | 95/101 |
| 6,106,593 | A | * | 8/2000 | Golden et al. | 95/120 |
| 6,270,557 | B1 | * | 8/2001 | Millet et al. | 95/96 |
| 6,273,939 | B1 | * | 8/2001 | Millet et al. | 95/106 |
| 6,302,943 | B1 | * | 10/2001 | Johnson et al. | 95/96 |
| 6,340,382 | B1 | * | 1/2002 | Baksh et al. | 95/96 |
| 6,409,800 | B1 | * | 6/2002 | Ojo et al. | 95/96 |
| 6,464,756 | B1 | * | 10/2002 | Plee | 95/96 |
| 6,503,299 | B2 | * | 1/2003 | Baksh et al. | 95/98 |
| 6,514,317 | B2 | * | 2/2003 | Hirano et al. | 95/96 |
| 2002/0108494 | A1 | * | 8/2002 | Sircar et al. | 95/96 |

FOREIGN PATENT DOCUMENTS

| EP | 0486384 A1 | * | 5/1992 |
| EP | 0548755 A1 | * | 6/1993 |
| EP | 0855209 A1 | * | 7/1998 |
| EP | 0893157 A1 | * | 1/1999 |
| FR | 2330433 A1 | * | 6/1977 |
| WO | WO 97/45363 A1 | * | 12/1997 |

* cited by examiner

*Primary Examiner*—Robert H. Spitzer
(74) *Attorney, Agent, or Firm*—Millen, White, Zelano & Branigan, P.C.

(57) ABSTRACT

Conducting a PSA process for the purification of gaseous hydrogen contaminated at least with CO and $N_2$ of the $H_1$ where the gas stream to be purified is passed through an adsorption region comprising at least one adsorbent based on zeolite 5A and one adsorbent based on zeolite X exchanged with calcium.

26 Claims, No Drawings

METHOD FOR PURIFYING HYDROGEN-BASED GAS MIXTURES USING A CALCIUM X-ZEOLITE

The invention relates to a process for the purification of hydrogen-based gas mixtures contaminated by carbon monoxide and nitrogen and optionally various impurities, such as carbon dioxide, water and saturated or unsaturated and linear, branched or cyclic $C_1$–$C_8$ hydrocarbons. The production of hydrogen of high purity is of great interest industrially, hydrogen being widely used in numerous synthetic processes, such as hydrocracking, the production of methanol, the production of oxoalcohols and various isomerization processes.

The process of the invention constitutes an improvement to conventional processes for the separating of hydrogen of PSA type, or processes by adsorption by pressure variation, using zeolites as adsorbent. The purification of hydrogen by adsorption is an industrial process of great importance: it is a matter of recovering hydrogen from a gas mixture originating, for example, from the catalytic reforming of natural gas or from the catalytic cracking, thermal cracking or hydrocracking of hydrocarbons. The principle of pressure swing adsorption (PSA hereinbelow) is applied, which principle was initially described by C. M. Skarstrom in U.S. Pat. No. 2,944,627. The first industrial plant employing this principle, dating from 1967, is disclosed in U.S. Pat. No. 3,430,418.

Industrial processes for the purification of hydrogen by pressure swing adsorption ($H_2$ PSA) use several adsorbers or columns comprising the adsorbents, filled in identical fashion, for operating under continuous conditions. As a general rule, the adsorbents are selected according to their ability to adsorb and to desorb one or more specific components. In PSA processes, the choice of the adsorbents is difficult and depends particularly on the nature of the mixture to be treated. However, in so far as the mixture to be purified generally comprises more than one impurity, it is desirable for the adsorbent to be able to adsorb and then desorb not just one but several of these impurities. In point of fact, the adsorption profile and the adsorption selectivity of a given constituent are often influenced by the presence, in the gas mixture, of other impurities, for example because of possible competition or because of poisoning of the adsorbent.

These various considerations account for the complexity of the problem of the optimization of PSA processes by improving the adsorbent. The criteria to be taken into consideration for the choice of the adsorbent are its ability to adsorb various impurities, its selectivity, its mechanical strength (it being necessary for the packing down of the adsorbent to be possible over a certain height, without crushing) and the pressure drop brought about.

When the gas to be purified comprises several impurities, it is often necessary to convey the gas to be purified over a bed composed not of just one but of several adsorbents distributed in the column in the form of layers, so that the impurities are selectively adsorbed on the various adsorbents, according to their affinity.

PSA processes operate with the use of pressure cycles: in a first phase, the adsorbent bed provides for the separation of at least one constituent of the mixture by adsorption of at least this constituent on the adsorbent bed. In a second phase, the adsorbent is regenerated by lowering the pressure. At each new cycle, it is thus essential for the desorption to be efficient and complete, so as to re-encounter an identical regenerated state at each new cycle. However, it is clear that this ability to adsorb and then desorb a specific constituent of a gas mixture depends on the specific operating conditions of the PSA process envisaged and in particular on the temperature and pressure conditions.

To optimize the PSA processes, the intermediate "decompression" and "compression" phases of the various adsorbent beds are synchronized: in particular, it is advantageous to introduce stages of pressure equalization between two adsorbent beds, one of these two beds being in the decompression phase and the other in the recompression phase, which makes possible a saving in energy. These various phases are rendered possible by a set of appropriate pipes and valves.

The capacity of the adsorbent beds is limited by the maximum size which can be used, either because of the mechanical strength of the individual adsorbent particles or because of the maximum size which can be used for the dispatch of the containers comprising the adsorbents. For this reason, the operation of four to twelve adsorbent beds positioned in parallel is standard in existing $H_2$ PSA plants.

As the minimum number of adsorbers in industrial $H_2$ PSA plants is four, the following are encountered:
  a column in the adsorption phase,
  a column in the decompression phase, it being possible for the latter to operate co- or countercurrentwise with respect to the column in the adsorption phase; in practice, generally cocurrentwise,
  a column in the purging phase (recycling of a portion of the purified hydrogen), it being possible for the latter to operate co- or countercurrentwise with respect to the column in the adsorption phase; in practice, generally countercurrentwise,
  a column in the phase of recompression with purified hydrogen, it being possible for the latter to operate co- or countercurrentwise with respect to the column in the adsorption phase; in practice, generally countercurrentwise.

By way of indication, the pressure for the adsorption phase is generally between 2 and 5 MPa and the (lowest) purging pressure is typically approximately 0.1 to 0.5 MPa.

Numerous combinations which allow the optimization of the operation of $H_2$ PSA processes exist: number of adsorbers, several levels of balancing pressure, and the like. A general overview of these combinations may be found in the publications by F. G. Wiessner (Gas Separation and Purification, 1988, vol. 2, September, p. 115) and by S. Sircar (Adsorption: Science and Technology, p. 285, 1989, edited by A. E. Rodriges et al.).

As regards production of hydrogen from a hydrogen-based gas mixture comprising CO, $CO_2$, $CH_4$, $N_2$ and $H_2O$ as impurities, U.S. Pat. No. 3,430,418 provides the combination of two types of adsorbent, the first, which is an active charcoal, ensuring the removal of $CH_4$, $CO_2$ and $H_2O$, and the second, which is a zeolite of A type with calcium, making possible the removal of nitrogen and carbon monoxide. Until recently, most existing industrial $H_2$ PSA plants used a zeolite of CaA type, commonly referred to as 5A type, as adsorbent intending to adsorb both CO and $N_2$.

To improve the performances of $H_2$ PSA processes and in particular for the purpose of obtaining a better hydrogen yield, the number and the positioning of the adsorbent beds operating in parallel has been varied; U.S. Pat. No. 4,381,189 and FR 2 330 433 illustrate such a step.

U.S. Pat. No. 4,477,267 has provided for the replacement of zeolite 5A by a zeolite of CaX type and has shown that a slight improvement in the hydrogen purity is thus obtained.

As regards existing industrial $H_2$ PSA plants, adsorbent beds comprising firstly a first layer of alumina and/or of silica gel, intended to trap water and heavy hydrocarbons, then a layer of active charcoal, intended to trap $CO_2$, methane and a few light hydrocarbons, and finally a layer of molecular sieve or zeolite, in order to trap carbon monoxide and nitrogen, are often encountered. The proportion of each layer depends on the composition of the gas to be purified and on the operating conditions of the process; see for example, the publication by C.-H. Lee et al., AIChE Journal, March 1999, vol. 45, no. 3, p. 535.

WO 97/45363 discloses the combination of an adsorbent of silica gel, active charcoal type, which makes possible the removal of impurities such as carbon dioxide or saturated or unsaturated and linear, branched or cyclic $C_1$–$C_8$ hydrocarbons, and of a zeolite of faujasite type with an Si/Al ratio of less than 1.5 exchanged to at least 80% with lithium, in order to adsorb carbon monoxide and nitrogen, instead of a zeolite 5A; this combination makes possible a significant increase in the hydrogen yield and productivity.

EP 855 209 discloses the use, instead of the 5A molecular sieve intended to adsorb CO and $N_2$, of a zeolite of faujasite type with an Si/Al ratio of between 1 and 1.5 exchanged to at least 85% in lithium or lithium+calcium with a molar ratio Li/Li+Ca$\geq$0.7.

These technical solutions provided in WO 97/45363 and EP 855 209, although more efficient in terms of purified hydrogen productivity and yield than conventional systems employing a zeolite 5A, are particularly expensive, given, on the one hand, the high cost of lithium-exchanged zeolites and, on the other hand, their difficulty of manufacture, in comparison with the low cost and the ease of manufacture of a zeolite of 5A type.

The present invention constitutes an improvement of a technical and economic nature to $H_2$ PSA processes of the prior art for the purification of hydrogen-based gas mixtures contaminated by carbon monoxide and nitrogen, and also by other impurities, such as carbon dioxide, water and saturated or unsaturated and linear, branched or cyclic $C_1$–$C_8$ hydrocarbons.

The $H_2$ PSA process according to the invention is characterized in that each adsorbent bed is subjected to the sequence of treatment cycles comprising the stages consisting in:

a) passing a hydrogen-based gas mixture contaminated by carbon monoxide and nitrogen and optionally including at least one other impurity, such as carbon dioxide, water or $C_1$–$C_8$ hydrocarbons, into an adsorption region comprising:

optionally at least one first adsorbent bed composed of one or more selective adsorbents for impurities such as carbon dioxide, saturated or unsaturated and linear, branched or cyclic $C_1$–$C_8$ hydrocarbons, of the methane, ethane, butane, propane, benzene, tolene or xylene type, or water, a second adsorbent capable of selectively adsorbing carbon monoxide, which is preferably a zeolite of the A type for which at least 35% and advantageously at least 60% of the exchangeable sites are occupied by calcium ions, a third adsorbent capable of selectively adsorbing nitrogen, which is a zeolite X of the faujasite type with an Si/Al ratio of less than 2, preferably in the region of 1, commonly known as zeolite LSX (for Low Silica X) at least 60% and preferably at least 80% of the exchangeable sites of which are occupied by calcium ions and optionally lithium ions;

b) desorbing the carbon monoxide, nitrogen and possible other impurities adsorbed on the adsorbents by the institution of a pressure gradient and gradual lowering of the pressure in the adsorption region, so as to recover the carbon monoxide, nitrogen and possible other impurities via the inlet of the adsorption region, it being possible for this stage to be complemented by a purging phase consisting in recycling a portion of the purified hydrogen; and c) raising in pressure the adsorption region by the introduction of a stream of pure hydrogen via the outlet of the adsorption region.

Thus, each adsorbent bed is subjected to a treatment cycle comprising a first phase of hydrogen production, a second phase of decompression and a third phase of recompression.

According to a preferred embodiment, the gas mixture comprises, in addition to hydrogen, carbon monoxide and nitrogen, at least carbon dioxide and methane. Mention will be very particularly made, as examples of such gas mixtures, of the gas mixtures resulting from catalytic cracking units, thermal cracking units, catalytic reforming units or hydrotreating units. The process of the present invention relates very particularly to the purification of hydrogen resulting from the reforming of natural gas, the molar composition of which with regard to impurities is as follows: approximately 20% of $CO_2$, 5% of CO, 5% of $CH_4$ and approximately 5% of $N_2$, along with traces of water and a few hydrocarbons.

The purity of the hydrogen according to the process of the invention can reach 99.999% when the gas mixture to be purified comprises more than 45 mol % of gaseous hydrogen.

The purification of a gas mixture comprising less than 45 mol % of gaseous hydrogen is not desirable, in so far as this requires an excessive amount of adsorbent and a disproportionate size of industrial plant in order to be able to achieve an acceptable purity. It is clear that the higher the proportion of hydrogen in the starting gas mixture, the purer the hydrogen recovered at the outlet of the adsorption region. The decision will preferably be made to purify a gas mixture comprising more than 70 mol % of hydrogen.

By adjusting the operating conditions of stages a) to c), not only are the yield and the productivity improved but also the purity of the hydrogen recovered at the outlet. As a general rule, in the context of the process of the invention, the adsorption region is maintained at a pressure of between 0.5 and 7 MPa, during the operation in which the gas mixture to be purified is brought into contact with the first (optional) and second adsorbents. However, a higher pressure is not harmful to the progress of the purification, However, out of concern for energy saving and because of the high cost of pressure-resistant plants, pressures situated above 7 MPa are generally avoided. Pressures below 0.5 MPa are not usually employed for the production of hydrogen by adsorption of impurities on an adsorbent bed, for reasons of efficiency. The pressure prevailing in the adsorption region will probably be maintained at a value below 5 MPa, better still below 3 MPa. Likewise, the adsorption region is preferably maintained above 0.5 MPa, preferably above 1.5 MPa.

The temperature of the entering gas mixture and of the adsorption region is not determining and is generally kept constant during the phase of adsorption of the impurities. This temperature is normally between 0 and 80° C., preferably between 20 and 50° C., during the adsorption.

The present invention applies to any type of PSA process for the purification of hydrogen and thus any modification of a parameter, such as pressure level, degree of purging, and the like, aimed at improving the performance of the process which can be combined with the essential characteristics of the process according to the invention which are set out above.

The present invention can be applied either during the design of a new PSA plant for the purification of hydrogen, which makes possible, in comparison with an industrial plant of the prior art operating with the same hydrogen productivity, a decrease in the size of the columns (and thus a decrease in the capital costs), or, in the case of the replacement of the adsorbents of the columns of an existing industrial plant by the adsorbents of the present invention, a significant improvement in the productivity.

In the adsorption region, the 1st, 2nd and 3rd adsorbents are positioned so that the gas mixture first passes through the optional 1st adsorbent, selective at least for impurities such as carbon dioxide or $C_1$–$C_8$ hydrocarbons, then the 2nd adsorbent, selective at least for CO, and finally the 3rd adsorbent, selective at least for nitrogen, during the adsorption stages.

Use may be made, as adsorbents selected at least for carbon dioxide and $C_1$–$C_8$ hydrocarbons (1st optional adsorbent), of active charcoal, alumina, silica gel or a mixture of these different adsorbents in any proportion. When such a mixture is chosen, the various constituents of the mixture can be positioned either in the form of a dry blend or, preferably, in the form of separate layers, so that the gas mixture comes successively into contact with each of the layers.

The silica gels which can be used according to the invention are the most widely used in industrial $H_2$ PSA plants for adsorbing water and hydrocarbons. These gels are commercially available, in particular from Solvay (sorbead gels).

The active charcoals are, for example, sold by Ceca, Norit, Carbotech, Pica or Chemviron.

According to the invention, the zeolites A and Z respectively 2nd and 3rd adsorbent) can be in the form of crystalline powders or of agglomerates, the latter form being preferred as it makes it possible to avoid pressure drops during the handling of said adsorbents during the stages of loading and unloading the columns of the industrial plants. Zeolite agglomerates are obtained conventionally by employing conventional agglomeration processes. The agglomerated zeolite can, for example, be prepared by mixing a crystalline zeolite powder with water and a binder (also generally in the powder form) and then spraying this mixture over zeolite agglomerates acting as agglomeration seed. During the spraying, the zeolite agglomerates are subjected to continuous rotation over themselves. This can be achieved by placing the agglomerates in a reactor in rotation over itself about an axis of rotation, the axis of rotation preferably being inclined with respect to the vertical direction. By this process, commonly denoted in the art by "snowball" process, agglomerates in the form of beads are obtained. The agglomerates thus obtained are subsequently subjected to calcination at a temperature of between approximately 400 and 700° C. Mention may be made, as example of binders, of clays, such as kaolin, silica and/or alumina.

The agglomerated zeolite thus obtained, which comprises a binder, can be used for the preparation of agglomerated zeolite with a low degree of binder, which can also be used in the process of the invention. Such zeolitic agglomerates with a low degree of binder are obtained according to techniques known to a person skilled in the art, such as the zeolitization of the binder. An example of the preparation of a zeolite with a zeolitized binder is disclosed in EP 893 157, the teaching of which is incorporated by way of reference.

Zeolites A and X are generally synthesized in the sodium form, i.e. most of their exchangeable sites are occupied by sodium ions; for these sodium zeolites to be usable as 2nd and 3rd adsorbents, it is necessary to subject them to an additional treatment, in the case of zeolite in the form of agglomerates, before or after the agglomeration stage, aimed at introducing calcium or (calcium and lithium) cations into the crystal lattice. This is carried out by ion exchange: a portion of $Na^+$ cations and/or of the other $M^+$ cations initially present in the crystal lattice of the zeolite being exchanged with calcium cations or with calcium and lithium cations, in this case either by simultaneous exchange of calcium and lithium ions or by exchange of one type of cation and then of the other.

Zeolites A arid X must be activated before use. According to the invention, the term "activation of a zeolite" is understood to mean its dehydration, that is to say the removal of the water of hydration present in the zeolite, As a general rule, it is seen to that the partial pressure of the water in the gas in contact with the zeolite is less than approximately 40 kPa, preferably 10 kPa, after activation. Processes for the activation of zeolites are known per se. One of these methods consists in subjecting the zeolite to a pressure of between approximately 10 kPa and 1 MPa while passing a stream of an inert gas through the adsorbent in the form of a bed composed of the zeolite and while heating the zeolite to a temperature of between 300 and 650° C. at a rate of temperature rise of approximately 0.1 to 40° C. per minute. In an alternative form, the zeolite can be activated while maintaining it under a vacuum of approximately 10 kPa or less while heating the zeolite to a temperature of approximately 300 to 650° C., without it being necessary to resort to flushing with an inert gas. Another alternative consists in activating the zeolite by a process using microwaves, as disclosed, for example, in U.S. Pat. No. 4,322,394.

Detailed procedures for the synthesis of agglomerated or nonagglomerated zeolite CaX and CaLSX are set out in the description of EP 486 384 and for the synthesis of a zeolite CaLiLSX in the description of EP 855 209, the teachings of which are incorporated here by way of reference while not thereby constituting a limitation of the invention. Prefered, as the 3rd adsorbent, are zeolites for which the ratio of the degree of exchange with respect to calcium to the sum of the degrees of exchange with respect to calcium and lithium: Ca/Ca+Li, is greater than or equal to 0.7 and advantageously in the region of 1.

For the employment of the adsorbent bed, it is possible a priori to combine the first (optional), second and third adsorbents in any ratio by weight. A person skilled in the art will, without particular difficulty, adjust the respective amounts of the various adsorbents, preferably as a function in particular of the respective amount of each impurity and of the adsorption capacity of the adsorbent capable of selectively adsorbing it.

EXAMPLES

In the examples which follow, the productivity of the PSA process is defined as the ratio of the volume of hydrogen produced, measured under standard temperature and pressure conditions, per unit of time and per volume of adsorbent. The yield is defined as the ratio of the volume of pure hydrogen produced, measured under standard pressure and temperature conditions, per volume of hydrogen present in the gas to be purified, also measured under standard pressure and temperature conditions.

A plant of PSA type with 4 columns is used:

a column in the adsorption phase, a column in the decompression phase, decompression taking place cocurrentwise with respect to the adsorption phase, a column in the purging phase, purging being carried out by recycling 20% by volume of the purified hydrogen countercurrentwise with respect to the adsorption phase, a column in the recompression phase, recompression being carried out countercurrentwise with respect to the adsorption phase with purified hydrogen.

Each column passes from one phase to the other in the order indicated above, each phase lasting 3 min. The high pressure is 2.5 MPa and the low pressure is 0.3 MPa.

The gas to be purified has the following molar composition: 5% CO, 5% $N_2$ and 90% $H_2$. A gas is taken as base which would therefore have already been purified by passage through preliminary layers of alumina, of silica gel and/or of active charcoal (optional 1st adsorbent).

Each column is filled with the same volume V of adsorbent or of 2 adsorbents, which are zeolites agglomerated with 20% by weight of clay binder, CaA, CaLSX and LiLSX with degrees of exchange respectively of 84% for calcium and 97% for lithium, the bulk densities of which are:

| | |
|---|---|
| zeolite 5A | 0.72 |
| zeolite CaLSX | 0.66 |
| zeolite LiLSX | 0.63 |

When the same volume of molecular sieve is introduced, there will be a greater weight, approximately 9% or more, of 5A molecular sieve present in comparison with LSX sieves.

The CO or $N_2$ adsorption capacities, expressed in mol/kg at 25° C. under a pressure of 0.1 MPa, of these 3 agglomerated zeolites are shown in the table below.

| Agglomerated zeolite | CaA | CaLSX | LiLSX |
|---|---|---|---|
| $N_2$ adsorption capacity | 0.4 | 0.95 | 0.81 |
| CO adsorption capacity | 1 | 1.7 | 2.1 |

Example 1

The 4 columns are filled with a single adsorbent, which is the agglomerated zeolite 5A defined above. The plant is operated for several cycles, until stationary conditions are achieved, namely a constant purity and a constant yield of hydrogen. The productivity obtained with this adsorbent, calculated according to the preceding definition, is deduced therefrom.

For a purity of 99.999% with respect to hydrogen produced and a yield of 80%, the value of the relative productivity of this zeolite is set at 100, which will be used as basis for comparison with the zeolites of the following examples.

Example 2

The 4 columns are filled with a single adsorbent, which is the agglomerated zeolite CaLSX defined above. As in Example 1, the plant is operated for several cycles, until stationary conditions are achieved.

For a purity of 99.999% with respect to hydrogen produced and a yield of 80%, a relative productivity 101 is obtained, that is to say a very slight improvement with respect to the 5A molecular sieve of Example 1. Although the $N_2$ and CO adsorption capacities of the zeolite CaLSX are markedly higher than those of the zeolite CaA (see above table), this does not result in a true improvement in the performance.

Example 3

The 4 columns are filled with a mixed bed of 2 adsorbents:

the 1st layer is composed of the zeolite 5A of Example 1 and occupies 65% of the total volume of each of the columns, the 2nd layer is composed of the zeolite CaLSX of Example 2 and occupies 35% of the total volume of each of the columns.

As in Example 1, the plant is operated for several cycles until stationary conditions are achieved, it being specified that, during the adsorption phases, the gas is first passed through the layer of zeolite 5A and then through the layer of CaLSX.

For a purity of 99.999% with respect to hydrogen produced and a yield of 80%, a relative productivity of 135 is obtained, that is to say a very marked improvement with respect to the adsorbents of Examples 1 and 2.

The combination according to the process of the invention of a zeolite 5A and a zeolite CaLSX results in a very significant improvement in performance, which was impossible to predict in the light of the results obtained for the adsorbents of the preceding Examples 1 and 2.

Example 4

The 4 columns are filled with a mixed bed of 2 adsorbents:

the 1st layer is composed of the zeolite 5A of Example 1 and occupies 65% of the total volume V of each of the columns, the 2nd layer is composed of the zeolite LiLSX defined above and occupies 35% of the total volume V of each of the columns.

As in Example 1, the plant is operated for several cycles until stationary conditions are achieved, it being specified that, during the adsorption phase, the gas is first passed through the layer of zeolite 5A and then through the layer of LiLSX.

For a purity of 99.999% with respect to hydrogen produced and a yield of 80%, a relative productivity of 142 is obtained, that is to say a very marked improvement with respect to Examples 1 and 2 and a slight increase with respect to. Example 3.

However, from an economic viewpoint, the solution indicated in Example 3 is markedly more advantageous for the industrial operator, given the high cost of a zeolite exchanged with lithium in comparison with the more reasonable cost of a zeolite exchanged with calcium.

What is claimed is:

1. A pressure swing adsorption process (PSA) for the purification of a hydrogen gas mixture containing contaminants comprising carbon monoxide and nitrogen and optionally at least one of carbon dioxide, water and $C_1$–$C_8$ hydrocarbons, comprising an adsorption region containing an inlet and outlet and the following successive stages:

a) passing said hydrogen gas mixture into the adsorption region comprising:

optionally at least one first adsorbent bed comprising one or more selective adsorbents for impurities selected from the group consisting of carbon dioxide, saturated or unsaturated linear, branched or cyclic $C_1$–$C_8$ hydrocarbons and water, and when said first adsorbent bed is employed, passing effluent from the first adsorbent bed directly into, a second adsorbent bed comprising a 5A zeolite capable of selectively adsorbing carbon monoxide, or when the first bed is not employed passing said hydrogen gas mixture containing contaminants directly into the second adsorbent bed and passing effluent from the second adsorbent bed into, a third adsorbent bed capable of selectively adsorbing nitrogen, which is a zeolite X of the faujasite type with an Si/Al ratio of less than 2, at least 60% of the exchangeable sites of which are occupied by calcium ions;

b) in a desorption stage, desorbing the carbon monoxide, nitrogen and possible other impurities adsorbed on the absorbents by providing of a pressure gradient and gradual lowering of the pressure in said adsorption region, so as to recover the carbon monoxide, nitrogen and optionally other impurities via the inlet of said adsorption region; and c) raising in pressure said adsorption region by the introduction of a stream of pure hydrogen via the outlet of the adsorption region, said process resulting in a substantially enhanced relative productivity compared to a process wherein the only difference is that the second and third adsorbent are the same and being either CaA or CaX, said relative productivity being calculated at stationary conditions for a hydrogen yield of 80% and a hydrogen purity of 99.999%.

2. A process according to claim 1, comprising intermediate "balancing" phases between two adsorbent beds: one of these two beds being in a decompression phase and the other in a recompression phase.

3. A process according to claim 1, wherein the desorption stage b) is complemented by a purging phase comprising recycling a portion of the purified hydrogen to the adsorption region.

4. A process according to claim 1, wherein at least one of the 2nd and 3rd adsorbents is agglomerated with a binder.

5. A process according to claim 4, comprising a stage of zeolitization of the binder or binders with which zeolites of the 2nd and/or 3rd adsorbents are agglomerated.

6. A process according to claim 1, comprising the 1st adsorbent bed, and wherein said first adsorbent bed comprises active charcoal, alumina or silica gel, alone, or as a dry blend mixture or as separate layers.

7. A process according to claim 1, wherein the zeolite of the 3rd adsorbent bed is such that the ratio of the degree of exchange with respect to calcium to the sum of the degrees of exchange with respect to calcium and lithium: Ca/Ca+Li, is greater than or equal to 0.7.

8. A process according to claim 7, wherein the ratio Ca/Ca+Li is about 1.

9. A process according to claim 1, wherein at least 35% of the 5A zeolite exchangeable sites are occupied by calcium ions.

10. A process according to claim 9, wherein at least 60% of the 5A zeolite exchangeable sites are occupied by calcium ions.

11. A process according to claim 10, wherein at least 80% of the exchangeable sites of the third adsorbent are occupied by calcium ions.

12. A process according to claim 9, wherein the Si/Al ratio of the third adsorbent is about 1.

13. A process according to claim 12, wherein at least 80% of the exchangeable sites of the third adsorbent are occupied by calcium ions.

14. A process according to claim 13, comprising the 1st adsorbent bed and wherein said first adsorbent bed comprises active charcoal, alumina or silica gel, alone, or as a dry blend mixture or as separate layers.

15. A process according to claim 13, wherein the hydrogen gas mixture to be purified comprises a hydrogen mixture resulting from the reforming of natural gas, and said hydrogen mixture is passed directly into the first bed or directly into the second.

16. A process according to claim 15, wherein effluent from the second adsorbent bed is passed directly into the third adsorbent bed.

17. A process according to claim 9, wherein at least 80% of the exchangeable sites of the third adsorbent are occupied by calcium ions.

18. A process according to claim 1, wherein at least 80% of the exchangeable sites of the third adsorbent are occupied by calcium ions.

19. A process according to claim 1, wherein effluent from the second adsorbent bed is passed directly into the third adsorbent bed.

20. process according to claim 1, wherein the hydrogen gas mixture comprises approximately 20% CO2, 5% CO, 5% $CH_4$, 5% $N_2$ and the remainder being substantially hydrogen.

21. A process according to claim 1, wherein said 5A zeolite is a CaA zeolite having an adsorption capacity at 25° C. under a pressure of 0.1 MPa of about 0.4 mol of $N_2$ per kilogram of adsorbent and about 1 mol of CO per kilogram of adsorbent; and said zeolite X is a low silica CaX having an adsorption capacity at 25° C. and under 0.1 MPa of about 0.95 mol of $N_2$ per kilograim of adsorbent and about 1.7 mol of CO per kilogram of adsorbent.

22. A pressure swing adsorption process(PSA) for the purification of a hydrogen gas mixture containing contaminants comprising at least about 65 mol % hydrogen, carbon monoxide and nitrogen and optionally at least one of carbon dioxide, water and $C_1$–$C_8$ hydrocarbons, comprising an adsorption region containing an inlet and outlet and the following successive stages:

a) passing said hydrogen gas mixture into the adsorption region comprising:

optionally at least one first adsorbent bed comprising one or more selective adsorbents for impurities selected from the group consisting of carbon dioxide, saturated or unsaturated linear, branched or cyclic $C_1$–$C_8$ hydrocarbons and water, and when said first adsorbent bed is employed, passing effluent from the first adsorbent bed into, a second adsorbent bed comprising a 5A zeolite capable of selectively adsorbing carbon monoxide, or when the first bed is not employed passing said hydrogen gas mixture containing contaminants into the second adsorbent bed and passing effluent from the second adsorbent bed into, a third adsorbent bed capable of selectively adsorbing nitrogen, which is a zeolite X of the faujasite type with an Si/Al ratio of less than 2, at least 60% of the exchangeable sites of which are occupied by calcium ions;

b) in a desorption stage, desorbing the carbon monoxide, nitrogen and possible other impurities adsorbed on the adsorbents by providing of a pressure gradient and gradual lowering of the pressure in said adsorption region, so as to recover the carbon monoxide, nitrogen and optionally other impurities via the inlet of said adsorption region; and c) raising in pressure said adsorption region by the introduction of a stream of pure hydrogen via the outlet of the adsorption region, said process resulting in a substantially enhanced relative productivity compared to a process wherein the only difference is that the second and third adsorbent are the same and being either CaA or CaX, said relative productivity being calculated at stationery conditions for a hydrogen yield of 80% and a hydrogen purity of 99.999%.

23. A process according to claim 22, wherein said 5A zeolite is a CaA zeolite having an adsorption capacity at 25° C. under a pressure of 0.1 MPa of about 0.4 mol of $N_2$ per kilogram of adsorbent and about 1 mol of CO per kilogram of adsorbent; and said zeolite X is a low silica CaX having an adsorption capacity at 25° C. and under 0.1 MPa of about 0.95 mol of $N_2$ per kilogram of adsorbent and about 1.7 mol of CO per kilogram of adsorbent.

24. The process of claim 22 wherein said hydrogen gas mixture contains at least about 70 mol % hydrogene.

25. A pressure swing adsorption process(PSA) for the purification of a hydrogen gas mixture containing contaminants comprising carbon monoxide and nitrogen and optionally at least one of carbon dioxide, water and $C_1$–$C_8$ hydrocarbons, comprising an adsorption region containing an inlet and outlet and the following successive stages:

a) passing said hydrogen gas at a pressure of at least 1.5 atmospheres mixture into the adsorption region comprising:
optionally at least one first adsorbent bed comprising one or more selective adsorbents for impurities selected from the group consisting of carbon dioxide, saturated or unsaturated linear, branched or cyclic $C_1$–$C_8$ hydrocarbons and water, and when said first adsorbent bed is employed, passing effluent from the first adsorbent bed into,
a second adsorbent bed comprising a 5A zeolite capable of selectively adsorbing carbon monoxide, or when the first bed is not employed passing said hydrogen gas mixture resulting from reforming natural gas containing contaminants into the second adsorbent bed and
passing effluent from the second adsorbent bed into, a third adsorbent bed capable of selectively adsorbing nitrogen, which is a zeolite X of the faujasite type with an Si/Al ratio of less than 2, at least 60% of the exchangeable sites of which are occupied by calcium ions;

b) in a desorption stage, desorbing the carbon monoxide, nitrogen and possible other impurities adsorbed on the adsorbents by providing of a pressure gradient and gradual lowering of the pressure in said adsorption region, so as to recover the carbon monoxide, nitrogen and optionally other impurities via the inlet of said adsorption region; and c) raising in pressure said adsorption region by the introduction of a stream of pure hydrogen via the outlet of the adsorption region, said process resulting in a substantially enhanced relative productivity compared to a process wherein the only difference is that the second and third adsorbent are the same and being either CaA or CaX, said relative productivity being calculated at stationary conditions for a hydrogen yield of 80% and a hydrogen purity of 99.999%.

26. A process according to claim 25, wherein said 5A zeulite is a CaA zeolite having an adsorption capacity at 25° C. under a pressure of 0.1 MPa of about 0.4 mol of $N_2$ per kilogram of adsorbent and about 1 mol of CO per kilogram of adsorbent; and said zeolite X is a low silica CaX having an adsorption capacity at 25° C. and under 0.1 MPa of about 0.95 mol of $M_2$ per kilogram of adsorbent and about 1.7 mol of CO per kilogram of adsorbent.

* * * * *

UNITED STATES PATENT AND TRADEMARK OFFICE
CERTIFICATE OF CORRECTION

PATENT NO. : 6,849,106 B2
DATED : February 1, 2005
INVENTOR(S) : Remi Le Bec

It is certified that error appears in the above-identified patent and that said Letters Patent is hereby corrected as shown below:

<u>Column 9,</u>
Line 17, change "absorbents" to -- adsorbents --.

<u>Column 11,</u>
Line 19, change "hydrogene" to -- hydrogen --.

<u>Column 12,</u>
Line 28, change "zeulite" to -- zeolite --.

Signed and Sealed this

Twenty-fourth Day of May, 2005

JON W. DUDAS
*Director of the United States Patent and Trademark Office*